US009773418B1

United States Patent
Smith et al.

(10) Patent No.: US 9,773,418 B1
(45) Date of Patent: Sep. 26, 2017

(54) MEANS OF CONTROLLING LARGE NUMBERS OF COMMERCIAL DRONES OVER AIRPORTS AND POPULATED AREAS

(71) Applicant: NORTHROP GRUMMAN SYSTEMS CORPORATION, Falls Church, VA (US)

(72) Inventors: Charles R. Smith, Acton, CA (US); Matthew A. Neal, Lancaster, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/418,345

(22) Filed: Jan. 27, 2017

(51) Int. Cl.
  *G08G 5/00* (2006.01)
  *B64C 39/02* (2006.01)
  *B64D 47/08* (2006.01)
  *G05D 1/10* (2006.01)
  *G06Q 10/08* (2012.01)

(52) U.S. Cl.
  CPC ......... *G08G 5/0043* (2013.01); *B64C 39/024* (2013.01); *B64D 47/08* (2013.01); *G05D 1/104* (2013.01); *G08G 5/0069* (2013.01); *B64C 2201/128* (2013.01); *G06Q 10/083* (2013.01)

(58) Field of Classification Search
  CPC .............................. G08G 5/0043; B64C 39/024
  See application file for complete search history.

(56) References Cited

U.S. PATENT DOCUMENTS

| | | | |
|---|---|---|---|
| 7,030,760 B1 * | 4/2006 | Brown ................... | B64F 1/368 235/384 |
| 9,104,201 B1 * | 8/2015 | Pillai ..................... | B64C 39/024 |
| 2014/0300473 A1 * | 10/2014 | Vatn ..................... | G08B 13/1427 340/540 |
| 2016/0117931 A1 * | 4/2016 | Chan ..................... | G08G 5/0043 701/120 |
| 2016/0253907 A1 * | 9/2016 | Taveira .................. | G08G 5/006 701/3 |
| 2017/0011340 A1 * | 1/2017 | Gabbai .................. | G06Q 10/0836 |
| 2017/0069214 A1 * | 3/2017 | Dupray ................. | G08G 5/0021 |
| 2017/0092109 A1 * | 3/2017 | Trundle ................ | B60L 11/1824 |
| 2017/0124884 A1 * | 5/2017 | Shaw ................... | H04W 28/0247 |
| 2017/0140655 A1 * | 5/2017 | Erickson .............. | G08G 5/0039 |

* cited by examiner

*Primary Examiner* — Truc M Do
*Assistant Examiner* — Jess Whittington
(74) *Attorney, Agent, or Firm* — John A. Miller; Miller IP Group, PLC

(57) ABSTRACT

A method for providing air traffic controlled flight of drones flying in to and out of an air traffic controlled space around an airport. The method includes causing the drones to congregate at a congregation area in the air traffic controlled space, causing the drones to fly from the congregation area as a group out of the air traffic controlled space under air traffic control, causing the drones to disperse from the group once the drones are out of the air traffic controlled space, causing the drones to fly to a package delivery location after they are dispersed to deliver the package, causing return drones to fly to a re-congregation area outside of the air traffic controlled space after they have delivered their packages, and causing the return drones to enter the air traffic controlled space as a group under air traffic control.

20 Claims, 3 Drawing Sheets

MEANS OF CONTROLLING LARGE NUMBERS OF COMMERCIAL DRONES OVER AIRPORTS AND POPULATED AREAS

BACKGROUND

Field

This invention relates generally to a method for providing air traffic controlled flight of a large number of commercial drones within an air traffic controlled space around an airport and, more particularly, to a method for providing air traffic controlled flight of a large number of commercial drones within an air traffic controlled space around an airport that includes causing a swarm of drones to congregate in a congregation area at the airport, causing the swarm of the drones to leave the congregation area as a group and fly out of the air traffic controlled space under air traffic control, causing the drones to disperse from the swarm to deliver a package to its destination, causing a swarm of return drones that are returning to the airport to congregate in a re-congregation area outside of the air traffic controlled space after they have delivered their package, and causing the swarm of returning drones to fly into the air traffic controlled space as a group under air traffic control and land at the congregation area.

Discussion

Small unmanned aerial vehicles (UAVs) or drones that are either remotely controlled or programmed to fly to a certain location using on-board battery power are becoming more and more prevalent. These drones have a number of purposes and features and typically employ cameras and/or other detectors for providing images. One proposed use of such drones is as a package delivery device, where small relatively light-weight packages are delivered from a distribution center or other facility operated by a carrier to a household or business. The drone is programmed with the delivery address or GPS coordinates of the delivery location and through GPS technology and vision capabilities flies to that location where it lands, releases the package and then returns to the distribution center to be recharged and be available to deliver another package. The various flight controls, object avoidance, safety, privacy and other logistics of such a package delivery system is currently being worked out so as to make the system viable.

Commercial carriers currently deliver a large volume of packages and other goods from various warehouses and other locations to an airport proximate the warehouse, which depending on where the package is going, are flown to an airport near that location on large cargo planes. For certain of these airports, a very high volume of commercial cargo will thus congregate. A facility operated by the carrier at the airport then sorts the packages based on their final destination so that groups of the packages can be delivered together. From there, the sorted packages are delivered by trucks and other vehicles to other warehouses, where the packages are delivered to their final destination by other, typically smaller, trucks. It is this final delivery leg of the package journey that commercial drones are currently being contemplated for delivering the packages to their final destination. In an alternate contemplated scenario, the truck that includes the sorted packages from the carrier facility at the airport drives along a certain route depending on the final destination of the packages in the truck, and drones periodically remove single packages from the truck when the truck is close to the packages final destination, where the drone then delivers the package to that destination and returns to the truck.

In the above described scenarios there would be some cost efficacy by removing the leg of the delivering system where the packages are driven from the airport on a truck to the warehouse where they are distributed by the drones by allowing the drones to deliver the packages directly from the airport. However, the main issue for being able to deliver light weight packages on drones from an airport is control of the air space around the airport. Particularly, even a small number of drones flying around an airport would need to be controlled so as to not interfere of the other air traffic in that area.

SUMMARY

The present invention discloses and describes a method for providing air traffic controlled flight of a large number of commercial drones flying in to and out of an air traffic controlled space around an airport. The method includes causing a plurality of the drones to congregate at a congregation area as a group in the air traffic controlled space, causing the plurality of drones to fly from the congregation area as a group out of the air traffic controlled space under air traffic control, causing the drones to disperse from the group once the drones are out of the air traffic controlled space, and causing the drones to fly to a package delivery location after they are dispersed to deliver the package. The method also includes causing a plurality of return drones to fly to a re-congregation area outside of the air traffic controlled space after they have delivered their packages, signaling to the air traffic control that the plurality of return drones at the re-congregation area are ready to return to the airport as a group, and causing the plurality of return drones to enter the air traffic controlled space as a group under air traffic control.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for providing air traffic controlled flight of a large number of commercial drones in an air traffic controlled space around an airport is merely exemplary in nature, and is in no way intended to limit the invention or its applications or uses.

Figure 1:
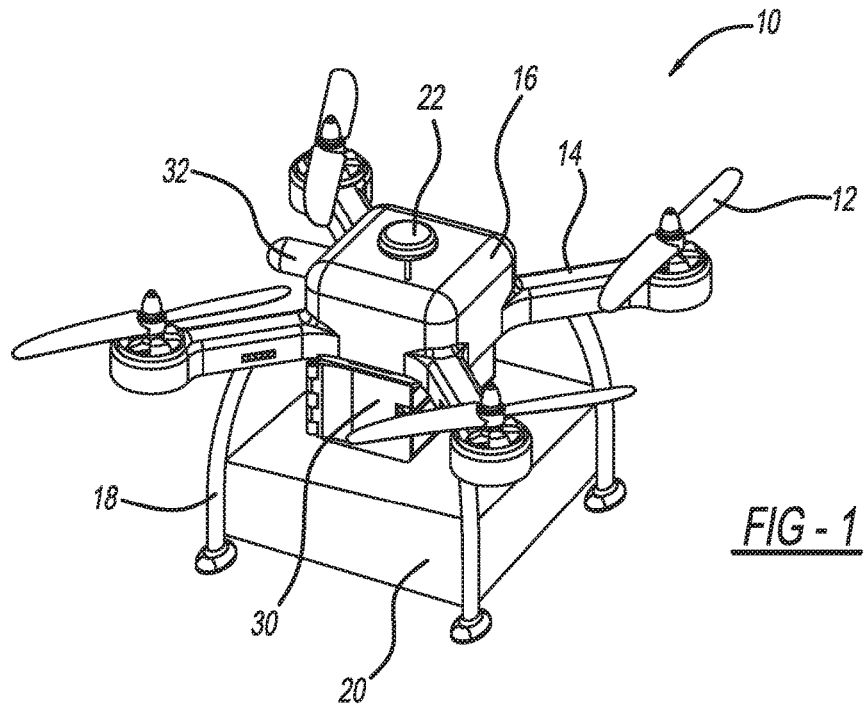
FIG. 1 is an isometric view of a drone that includes the capability for carrying and delivering a package.

FIG. 1 is an isometric view of a package delivery UAV or drone 10 including four rotors 12 mounted on arms 14 extending from a drone body 16. It is noted that the drone 10 is merely described herein for discussion purposes in that many different types and sizes of drones can be employed to deliver packages consistent with the discussion herein. The drone 10 also includes a grasping device 18 shown grasping a package 20 to be delivered. An antenna 22 receives and transmits signals for communicating with the drone 10 and controlling the flight of the drone 10, as discussed herein. The antenna 22 is intended to represent any and all of the antennas that are necessary to receive and transmit signals at the various frequency bands that allow the drone 10 to receive GPS signals, signals that allow multiple drones to communicate with each other, signals that allow the drone 10 to communicate with other entities, such as police, signals that allow the drone 10 to receive data and other information for flight control, etc. The drone 10 includes a controller 30 that controls the flight of the drone 10 based on information received from any suitable location, where the controller 30 is intended to represent any and all controllers that may be necessary on the drone 10, such as a GPS receiver, rotor control, destination control, direction control, collision avoidance control, etc. All of the algorithms that are employed in the controller 30 are able to be configured on a single chip, which is light weight and inexpensive to allow the drone 10 to operate in the manner discussed herein.

A vision sensor 32 is provided on the drone body 16 that is able to detect and process images, either visible images or infrared images, to help the drone 10 identify its location, proximity to other drones, proximity to other obstacles, package delivery location, etc. The vision sensor 32 can be any suitable vision sensor for the purposes discussed herein, such as an imaging sensor, a visible light camera, an electro-optical short-medium wave or long wave infrared camera, etc. The vision sensor 32 can detect and track features on the ground for GPS-denied navigation if the GPS signals are not available. The controller 30 can provide automatic target detection and recognition using images from the sensor 32 and can include an algorithm for detecting an extracting region of interest, a feature extraction algorithm to extract features that best describe a location, supervised-learning algorithm for clutter rejection and/or target identification, and a nearest-neighbor correlation algorithm for aim-point selection. Further, the controller 30 can use flex targeting that does not require the drone 10 to learn about a specific target and to recognize that target, where the flight direction of the drone 10 is directed to an aim-point. The vision sensor 32 is also employed to allow the drone 10 to identify and communicate with other drones that may be within its vicinity, as will become obvious from the discussion below.

As will be discussed below, the present invention proposes using commercial drones of the type shown in FIG. 1 to deliver packages from an airport carrier facility to the final destination of the packages or another carrier facility, depending on distance, drone size and other factors, instead of requiring that the packages be driven off of the airport grounds in a truck or other vehicle. In one embodiment, a large swarm of the drones form as a group on the ground at a congregation area away from all other air and ground traffic at the airport, become airborne as a swarm under air traffic control at the congregation area, and fly out of the air traffic controlled space under air traffic control as a group. Once the group of drones is out of the air traffic controlled space they are dispersed as independent drones to their destination to deliver their package. Once the drone delivers its package it will fly to a pre-designated re-congregation area outside of the air traffic controlled space, where the drone is reconfigured with other returning drones as swarm, provide a signal to the airport traffic control that the drones are ready to return to the airport as a group, fly back into the air traffic controlled space under air traffic control as a group, and land at the congregation area to be ready to be reconfigured as a group with another package. The use of air traffic control herein is intended to be for either ground control or air space control at the airport.

Figure 2:
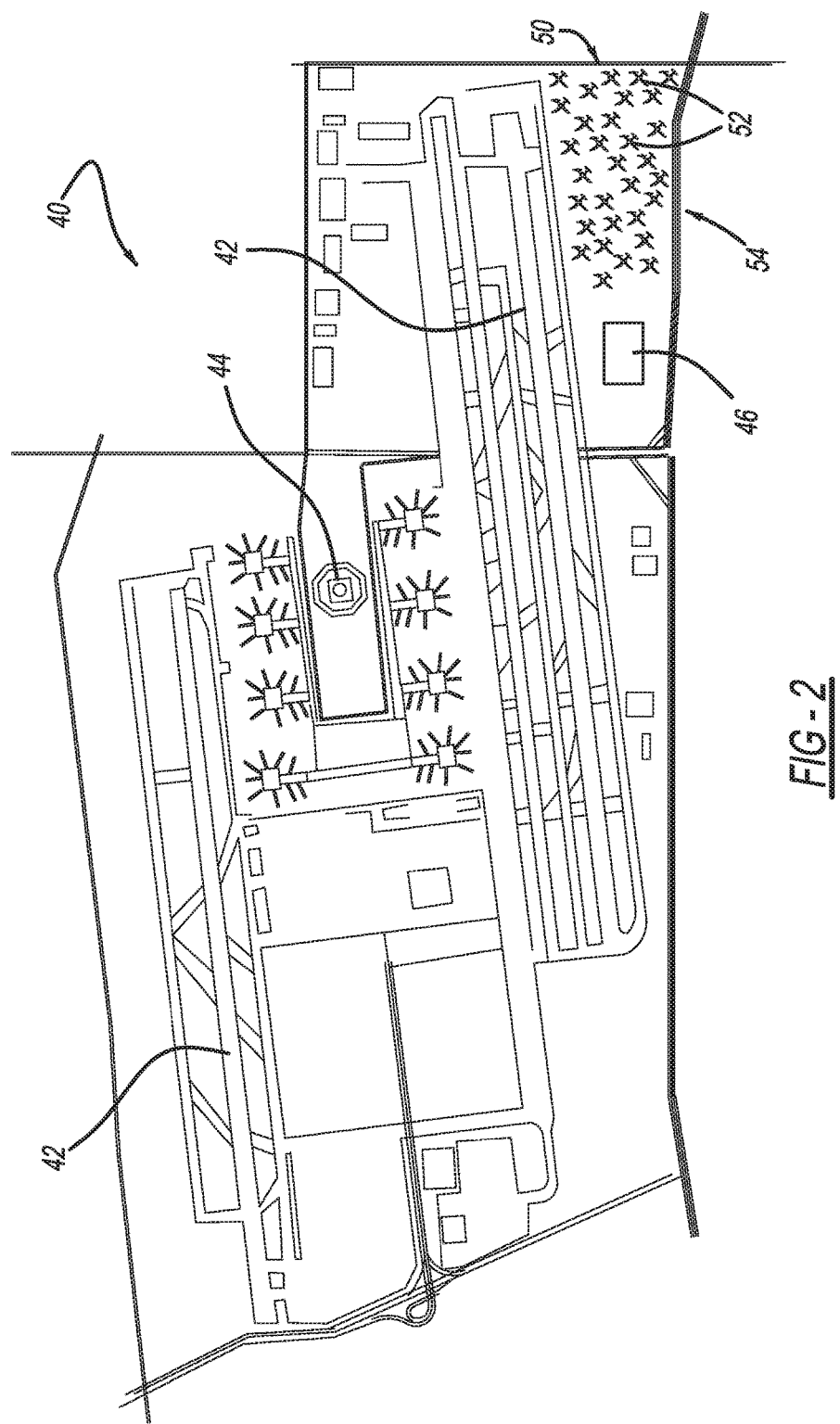
FIG. 2 is a top down illustration of an air traffic controlled space around an airport and depicting a swarm of drones congregating at a congregation area to fly out of the air traffic controlled space.

FIG. 2 is a top down illustration of this embodiment showing an airport 40 including runways 42, an air traffic control tower 44 including the appropriate air traffic control systems and capabilities and a carrier facility 46. The packages may be off-loaded from aircraft (not shown) onto a vehicle (not shown) which takes the packages to the facility 46 where they are placed on a conveyor belt (not shown). A robot (not shown) may read a bar code on the package indentifying its destination, and the package may be sorted by robots based on that destination to be placed on a drone. The carrier facility 46 has the capability of receiving a large volume of packages that have been flown into the airport 40 on cargo aircraft, sorting the packages for delivery, housing and maintaining a large number of drones, including a battery recharging capability of the drones, attaching packages to each drone for delivery of the packages to a final destination, and downloading information to each drone for delivery of the package.

A congregation area 50 is provided proximate the facility 46 where drones 52 can congregate as a swarm 54 of the drones 52 to leave the airport 40, as discussed above. Once the swarm 54 of the drones 52 has congregated in the congregation area 50 and are ready to leave the airport 40, a leader drone or a control entity at the carrier facility 46 will notify air traffic control in the control tower 44 that the swarm 54 of the drones 52 is ready to leave the airport 40. Based on other traffic coming in to and out of the airport 40, air traffic control will send a signal back to the leader drone or the control entity that they can leave the air traffic controlled space as a group during a certain time slot through a predetermined section of the airspace, which may include the shortest route from the congregation area 50 out of the air traffic controlled space. The drones 52 are communicating with each other while they are assembled as the swarm 54 so that they maintain their proper flight distances from each other as they are flying. Once the group of the drones 52 leaves the air traffic controlled space, they then are released from the swarm 54 and fly to their final destination. Once the swarm 54 is dispersed, the drones 52 no longer need to communicate with each other, but need to be able to avoid other things in the air, such as other drones for other purposes, birds, etc. The drones 52 generally fly to their destination based on GPS coordinates that are programmed into the controller 30. However, if for some reason GPS signals are not available, then the drones 52 are able to fly to their destination under a GPS-denied protocol using various vision algorithms as discussed above.

Figure 3:
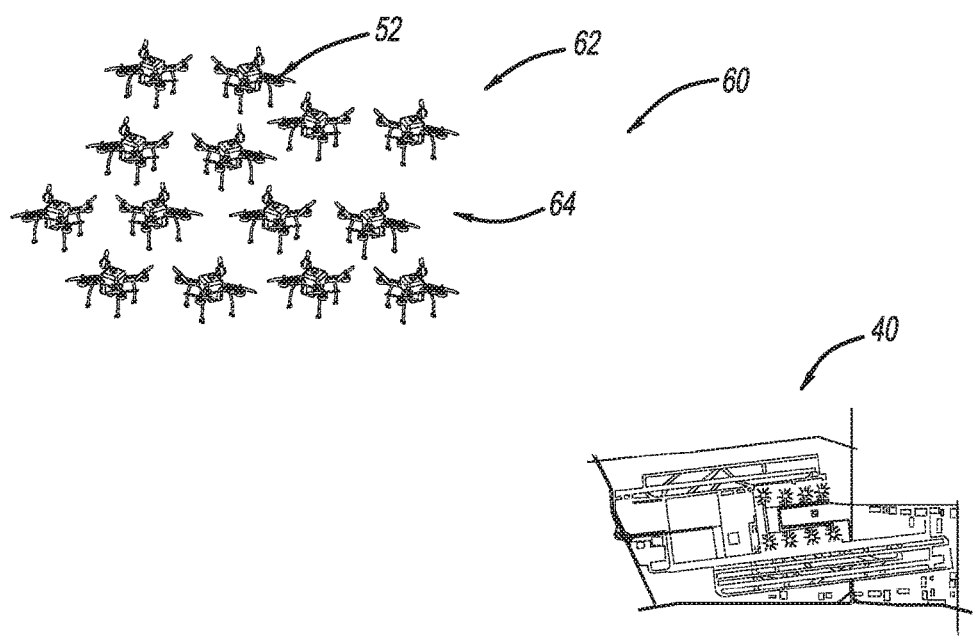
FIG. 3 is an illustration of a re-congregation area depicting a swarm of return drones congregating to return to the air traffic controlled space.

FIG. 3 is an illustration 60 showing a pre-designated re-congregation area 62 that is outside of the air traffic controlled space, where the airport 40 can be seen off into the distance. The illustration 60 also shows a number of the drones 52 assembling in the re-congregation area 62 after they have delivered their packages, where they are waiting to return to the carrier facility 46 as a group. At a predetermined time and/or after a predetermined number of the drones 52 have assembled, one or more of the drones 52 will signal to the air traffic control that they are ready to return to the airport 40 as a group. Once again, based on air traffic coming in to and out of the airport 40, air traffic control will assign a time slot and a section of the air traffic controlled space for the group of the drones 52 to return to the carrier facility 46. It is noted that the actual drones 52 in the returning group may or may not be the same drones or the same number of the drones 52 that were in the swarm 54 that left the air traffic controlled space. The drones 52 will return to the congregation area 50 under air traffic control, where they are processed and recharged for delivery of another package.

The embodiment discussed above relies on air traffic control to control the flight of the swarm 54 of the drones 52 when entering and leaving the air traffic controlled space at the airport 40. In an alternate embodiment, a pair of separate drone corridors are defined through the air traffic controlled space that other air traffic is not allowed to fly through so that the drones can independently fly through the corridors without the need to be controlled by air traffic control.

Figure 4:
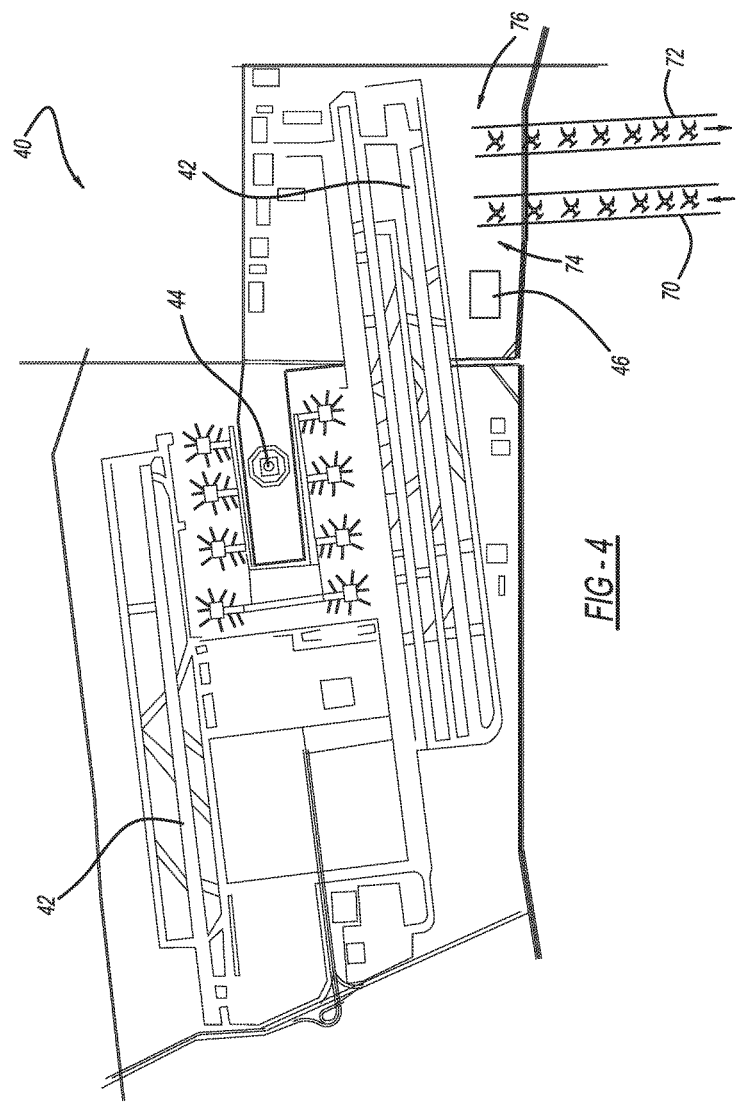
FIG. 4 is a top down illustration of an air traffic controlled space around an airport and showing drones leaving the air traffic controlled space and returning to the air traffic controlled space through incoming and outgoing corridors.

FIG. 4 is an illustration of the airport 40 showing this embodiment. The airport 40 includes an inbound corridor 70 and an outbound corridor 72 and depicting a number of drones 74 flying therethrough. The corridors 70 and 72 are designated corridors for the drones 74 to fly through which means that air traffic control would not allow any other aircraft to fly through these controlled airspace areas. The corridors 70 and 72 are of the appropriate size, are of the appropriate length and are at the appropriate location for the purposes described herein. Each of the drones 74 is programmed for its flight pattern to remain in the particular corridor 70 or 72 so that it does not fly into any other controlled airspace at the airport 40. The drones 74 leaving the airport 40 through the outbound corridor 72 lift off from a lift off area 76 near the carrier facility 46 to fly through the corridor 72. Likewise, the drones 74 entering the air traffic controlled space enter the corridor 70 at an output end of the corridor 70 and fly to a landing area 74 near the carrier facility 46. The drones 74 that are flying within the corridors 70 and 72 are in communication with each other so that they maintain suitable airspace from each other and prevent collisions. The drones 74 can enter either of the corridors 70 and 72 at any time as long as they have appropriate situation awareness relative to each other, i.e., whenever an open opportunity arises to travel through the corridors 70 and 72.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the ingress and egress of drones into and out of an air traffic controlled space around an airport, said method comprising:
   providing instructions to a fleet of drones each including one or more communications system and a controller configured to receive and follow the instructions, said controller;
   causing a plurality of drones from the fleet of drones to congregate at a congregation area as a group in the air traffic controlled space;
   signaling to aircraft traffic control that the plurality of drones at the congregation area are ready to depart the airport as a group;
   causing the plurality of drones to fly from the congregation area as a group out of the air traffic controlled space under air traffic control;
   causing individual drones from the plurality of drones to disperse from the group once the individual drones are out of the air traffic controlled space;
   causing the individual drones to fly to a package delivery location after they are dispersed to deliver a package;
   causing a plurality of return drones from the fleet of drones to fly to a return re-congregation area outside of the air traffic controlled space after they have delivered their package;
   signaling to the aircraft traffic control that the plurality of return drones at the re-congregation area are ready to return to the airport as a group; and
   causing the plurality of return drones to enter the air traffic controlled space as a group under air traffic control.

2. The method according to claim 1 wherein the congregation area is located proximate a carrier facility that receives packages to be sorted and attached to the plurality of drones for delivery.

3. The method according to claim 2 further comprising providing the packages from a cargo plane that has landed at the airport to the carrier facility.

4. The method according to claim 1 wherein the plurality of drones each include a vision sensor for providing images of an area around which the drone is flying.

5. The method according to claim 1 wherein the package delivery location is a home.

6. The method according to claim 1 wherein the plurality of drones that have congregated at the congregation area and are flying through the air traffic controlled space are in communication with each other.

7. The method according to claim 1 wherein causing the individual drones to fly to the delivery location includes using GPS control.

8. The method according to claim 1 wherein causing the individual drones to fly to the delivery location includes using GPS-denied control.

9. A method for controlling the ingress and egress of drones into and out of an air traffic controlled space around an airport, said method comprising:
   providing a fleet of drones each including one or more communications system and a controller configured to receive and follow instructions, wherein the fleet of drones each include a vision sensor for providing images of an area around which the drone is flying;
   providing packages that arrive at the airport on a cargo plane to a carrier facility at the airport;
   selectively attaching a separate package to each individual drone in a plurality of drones from the fleet of drones at the carrier facility;
   providing instructions to the controller in each individual drone in the fleet of drones, said controller;
   causing the plurality of drones to congregate at a congregation area as a group in the air traffic control space proximate the carrier facility;
   signaling to aircraft traffic control that the plurality of drones at the congregation area are ready to depart the airport as a group;
   causing the plurality of drones to fly from the congregation area as a group out of the air traffic controlled space under air traffic control;
   causing the individual drones to disperse from the group once the individual drones are out of the air traffic control space;

causing the individual drones to fly to a package delivery location after they are dispersed to deliver their package;

causing a plurality of return drones from the fleet of drones to fly to a return re-congregation area outside of the air traffic controlled space after they have delivered their package;

signaling to the air traffic control that the plurality of return drones at the re-congregation area are ready to return to the airport as a group;

causing the plurality of return drones to enter the air traffic controlled space as a group under air traffic control; and causing the plurality of return drones to return to the congregation area.

10. The method according to claim 9 wherein the package delivery location is a home.

11. The method according to claim 9 wherein causing the individual drones to fly to the delivery location includes using GPS control.

12. The method according to claim 9 wherein causing the individual drones to fly to the delivery location includes using GPS-denied control.

13. A system for controlling the ingress and egress of drones into and out of an air traffic controlled space around an airport, said system comprising:

a fleet of drones each including a controller configured to receive and follow instructions;

means for providing instructions to the controller in each individual drone in the fleet of drones, said controller;

causing a plurality of drones to congregate at a congregation area as a group in the air traffic controlled space;

causing a communications system to signal to aircraft traffic control that the plurality of drones at the congregation area are ready to depart the airport as a group;

causing the plurality of drones to fly from the congregation area as a group out of the air traffic controlled space under air traffic control;

causing individual drones from the plurality of drones to disperse from the group once the individual drones are out of the air traffic controlled space;

causing the individual drones to fly to a package delivery location after they are dispersed to deliver their package;

causing a plurality of return drones to fly to a return re-congregation area outside of the air traffic controlled space after they have delivered their package;

causing the communications system to signal to the aircraft traffic control that the plurality of return drones at the re-congregation area are ready to return to the airport as a group; and causing the plurality of return drones to enter the air traffic controlled space as a group under air traffic control.

14. The system according to claim 13 wherein the congregation area is located proximate a carrier facility that receives packages to be sorted and attached to the plurality of drones for delivery.

15. The system according to claim 14 further comprising means for providing the packages from a cargo plane that has landed at the airport to the carrier facility.

16. The system according to claim 13 wherein the fleet of drones each include a vision sensor for providing images of an area around which the drone is flying.

17. The system according to claim 13 wherein the package delivery location is a home.

18. The system according to claim 13 wherein the fleet of drones each includes a communications system for communicating with each other.

19. The system according to claim 13 wherein causing the individual drones to fly to the delivery location uses GPS control.

20. The system according to claim 13 wherein causing the individual drones to fly to the delivery location uses GPS-denied control.

* * * * *